United States Patent [19]

Parker et al.

[11] Patent Number: 4,869,851
[45] Date of Patent: Sep. 26, 1989

[54] VAPOR/LIQUID CONTACT DEVICE AND METHOD OF MIXING A VAPOR FLOW AND A COUNTER CURRENT REFLUX LIQUID FLOW

[75] Inventors: Trent J. Parker; Byron M. Parker, both of Salt Lake City, Utah

[73] Assignee: Uni-Frac Inc., Salt Lake City, Utah

[21] Appl. No.: 189,612

[22] Filed: May 13, 1988

Related U.S. Application Data

[63] Continuation-in-part of Ser. No. 54,181, May 26, 1987, Pat. No. 4,762,651.

[51] Int. Cl.$^4$ .................................................. B01F 3/04
[52] U.S. Cl. .................................................. 261/114.1
[58] Field of Search .......................... 261/114.1, 114.3

[56] References Cited

U.S. PATENT DOCUMENTS

| | | | |
|---|---|---|---|
| 1,811,247 | 6/1931 | Smith | 261/114.1 |
| 2,457,686 | 12/1948 | Kopita | 261/113 |
| 2,713,478 | 7/1955 | Ragatz | 261/114.1 |
| 2,737,377 | 3/1956 | Huggins et al. | 261/114 |
| 2,747,849 | 5/1956 | Colburn et al. | 261/114.1 |
| 2,926,754 | 3/1960 | Ragatz | 183/121 |
| 3,062,517 | 11/1962 | Voetter et al. | 261/114 |
| 3,282,576 | 11/1966 | Bruckert et al. | 261/114.1 |
| 3,362,696 | 1/1968 | Vaughan | 261/114 |
| 3,759,498 | 9/1973 | Matsch | 261/114.3 |
| 4,234,544 | 11/1980 | Christman | 261/114.1 |
| 88275,021 | 6/1981 | Kirkpatrick | 261/114.1 |

FOREIGN PATENT DOCUMENTS

| | | | |
|---|---|---|---|
| 693413 | 7/1940 | Fed. Rep. of Germany | 261/114.1 |
| 546356 | 2/1977 | U.S.S.R. | 261/114.3 |
| 1101244 | 7/1984 | U.S.S.R. | 261/114.1 |
| 817579 | 8/1959 | United Kingdom | |

Primary Examiner—Tim Miles
Attorney, Agent, or Firm—Kenyon & Kenyon

[57] ABSTRACT

An effectively rectangular vapor/liquid contact tray, for utilization in fractionation columns, towers, and the like, for effecting distillation, fractionation, rectifiction, absorption, and refining of various liquid materials such as petroleum, chemical and alcohol solutions. Provisions are made in the contact tray to reduce the magnitude of vapor-pressure drop between successive contact chambers as well as to provide a positive and more effective vapor/liquid contact. This result is effected through the empolyment of a series of mutually spaced parallel baffles. They are arranged transverse to and submerged in fluid flow, this to take advantage of the advancing liquid's kinetic energy and resulting recirculation zones associated with the baffles and upstream from the outlet weir of the contact tray. Vapor admittance apertures are provided proximate the downstream surfaces of the baffles, through the contact tray, so as to assure positive vapor/liquid contact and to take advantage of low pressure conditions thereat. The vapor admittance apertures are arranged for progressively less vapor flow through the tray in the downstream direction.

18 Claims, 11 Drawing Sheets

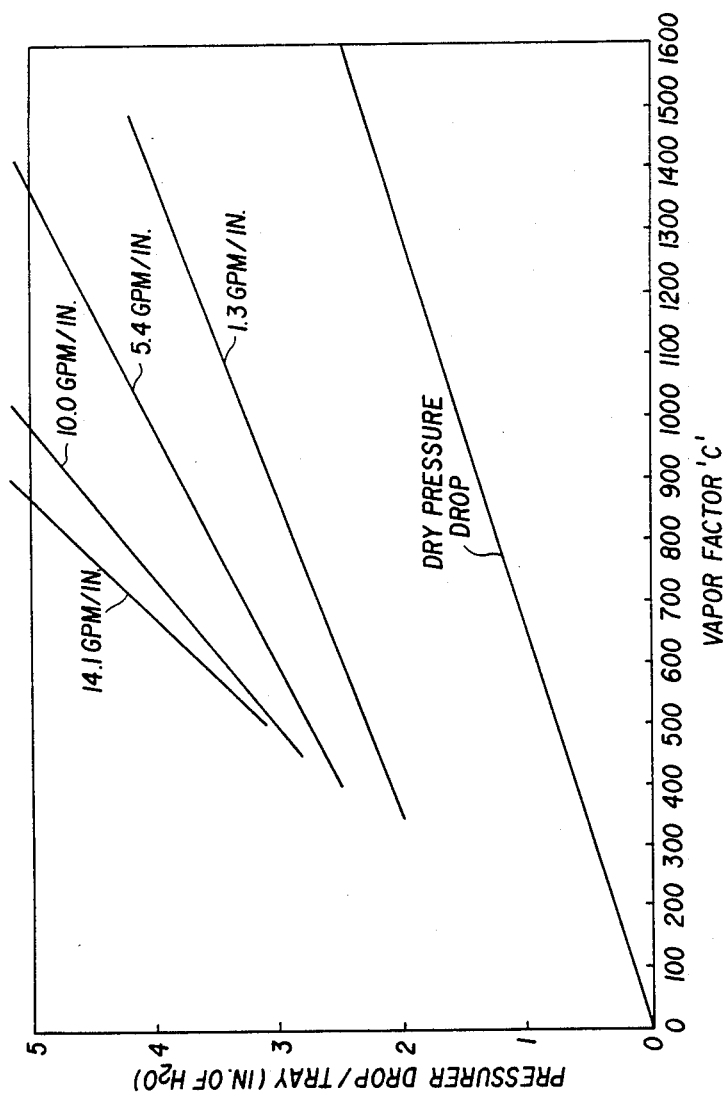

VAPOR/LIQUID CONTACT DEVICE AND METHOD OF MIXING A VAPOR FLOW AND A COUNTER CURRENT REFLUX LIQUID FLOW

RELATED APPLICATION

This application is a continuation-in-part of co-pending application Ser. No. 054,181, filed May 26, 1987, now U.S. Pat. No. 4,762,651, issued Aug. 9, 1988.

FIELD OF THE INVENTION

The present invention is directed to vapor/liquid contact trays useful in fractional distillation columns, by way of example, and, more particularly, to a new and improved contact tray which is more efficient than ones heretofore devised and which produces a pressure drop of less magnitude between contact chambers.

BACKGROUND OF THE INVENTION

There are three major problems confronting the fractionation industry. One problem is that of maldistribution of liquid across a contact tray, outlined in some detail in Canadian Patent No. 949,444, issued June 18, 1974 and entitled LIQUID-GAS CONTACT TRAY (Matsch). A major cause of maldistributions, and hence uneven vapor/liquid contact is the varying cross-section of liquid across such contact tray. This varying cross-section causes an ineffective bubble area on the side or sides of the contact tray termed by some authors as "end wastage area". This phrase has been used by Professor Matthew Van Winkle of the University of Texas, Chemical Engineering Department, in his text entitled "Distillation", see page 574, published by McGraw-Hill, 1967. This is a continually occurring problem in round columns, and such problem can be eliminated by employing an effectively rectangular contact tray as is taught in the inventors' co-pending patent application, Ser. No. 840,134, filed Mar. 17, 1986 and entitled VAPOR/LIQUID CONTACT COLUMN STRUCTURE, now U.S. Pat. No. 4,750,975, issued June 14, 1988. This co-pending patent application also teaches the imperical reasons for employment of essentially rectangular vapor/liquid contact trays wherein fluid flow is uniform and unidirectional over the plate.

A second problem presently confronting the industry is the magnitude of the vapor-pressure drop across a contact tray; the greater the drop, the greater the summation of pressure drops over the height of the column and hence the greater the energy requirement to force the vapors upwardly through the contact trays. The present invention substantially reduces vapor pressure drop across individual trays by means of employment of kinetic energy of fluid flowing over submerged baffles arranged mutually parallel and transverse to fluid flow.

A third problem of the industry is achieving effective uniform contact between the liquid and vapor at the tray. More contacts between liquid and vapor, where the heat transfer or mass transfer takes place, increases efficiency and reduces energy consumption. With the employment of submerged baffles or weirs, there is effected a greater contact of liquid and vapor which creates more heat transfer thereat and is more efficient.

SUMMARY OF THE INVENTION

According to the present invention, an effectively rectangular vapor/liquid contact tray is provided. By "effective" is meant that either the tray itself is structurally rectangular or it is "effectively" rectangular in the sense that upstanding and opposite baffle sides may have inner edges constraining the side boundaries of fluid-flow to a mutually parallel condition. Thus, as fluid flows from one end of the tray to the opposite end, such liquid flow will have uniform cross-section and velocity. Accordingly, pressure gradients transverse to the direction of fluid flow are eliminated and fluid flow proceeds at a uniform rate across the tray, from its inlet end to the outlet weir of the tray.

Between the opposite ends of the tray are mutually spaced parallel baffles that are disposed transverse to the direction of fluid flow and which will be submerged relative thereto. The baffles divide the tray into a plurality of inter-baffle sectors. A series of apertures for ascending vapors will be provided in the tray proximate the downstream sides of the respective baffles. The baffles themselves are preferably advantageously mutually spaced in the manner as hereinafter described, such spacing preferably equalling of the order of 5.5 times the baffle height. The liquid/vapor contact holes or apertures are in a restricted area preferably equal to one-half or less of the length of each inter-baffle sector leaving an essentially aperture-free reflux liquid recirculation zone within each inter-baffle sector. The purpose for such aperture positionment is to take advantage of the low-pressure areas immediately at the downstream sides of the baffles, so as to effect positive vapor/liquid contact at each baffle and to reduce pressure-drop across the plate.

Pursuant to a feature of the invention, the sets of apertures provided between baffles will vary; that is, the summation of hole areas will be greatest relative to inter-baffle sectors proximate the feed end of the tray and progressively less for subsequent inter-baffle sectors of the tray. Furthermore, each of the essentially aperture-free reflux-liquid recirculation zones provides a relatively quiescent or froth disengagement zone proximate the leading edge of the next succeeding baffle. Such quiescent zone is generally absent frothing characteristics and, instead, by virtue of the presence of the next succeeding baffle, will cause a generation of return-flow eddy currents which will return reflux liquid, or at least portions thereof, back to the respective hole patterns provided in the base of the tray. The eddy current production increases enrichment of vapors at the individual aperture zones of the tray. Furthermore, increased holes or apertures proximate the feed end of the tray effects an increased release of ascending lighter-fractional vapors from reflux liquid proximate the feed of the tray. As to all inter-baffle sectors, the liquid-vapor contact holes or apertures are in a restricted area proximate the trailing edge of the upstream baffle in part defining such zone. Thus, there is increased positive vapor-liquid contact at each inter-baffle sector area which operates to reduce pressure-drop across the tray.

The present invention has application to petroleum, fractionation, alcohol distillation, and rectification, absorption, and indeed, whenever resort is to be had for separating or combining liquids and semi-liquid materials. It is further to be noted that the invention can be applied, by way of retrofitting, to existing columns or for incorporation into new columns. Advantages of the present invention are that operating efficiencies are increased and capital costs are reduced. Operating energy requirements are also reduced over prior contact-tray designs.

For a better understanding of the above and other features and advantages of the present invention, reference should be made to the detailed description and to the accompanying drawings.

BRIEF DESCRIPTION OF THE DRAWINGS

In FIGS. 8 and 9, the aperture or hole sizes are relatively large, with the number of holes being progressively reduced for downstream tray areas, with the greater summation of hole passage areas being greatest at that baffle near the feed end of the tray; subsequent hole patterns are less in number and/or area of summation or succeeding baffles or plate zones; and FIG. 9 illustrates that weir or baffle height may be uniform for some if not all areas of the contact tray.

In FIGS. 8 through 11, the holes for each inter-baffle sector of the tray is proximate the trailing edge of the upstream baffle, thus leaving reflux-recirculation quiescent zones for slow return, through eddy current generation, of reflux liquid back over the holes of the tray sector in question.

FIGS. 12-19 pertain to actual air-water flow simulation tests.

FIG. 12 is a graph illustrating the flooding and dumping curves of the contact tray of FIGS. 8 and 9.

FIG. 13 is a graph pertaining to operation of the contact tray of FIGS. 8 and 9.

FIG. 14 is a graph of the flooding and dumping curves of the plate of FIGS. 10 and 11.

FIG. 15 is a graph showing the operational characteristics of the contact tray of FIGS. 10 and 11.

FIGS. 16 and 17 are a top plan schematic illustration and side elevation view, respectively, of a prior art contact tray used in air-water flow simulation tests to provide a comparison between the operational characteristics of the prior art and the contact tray of the present invention, as illustrated in FIGS. 8-11.

FIG. 18 is a graph illustrating the flooding and dumping curves of the contact tray of FIG. 16.

FIG. 19 is a graph showing the operational characteristics of the prior art contact tray of FIGS. 16 and 17.

By way of definition, the air flow rate "C" factor referred to herein is defined as follows:

$$C = \frac{W}{Av} \cdot \frac{1}{[V \cdot (L - V)]^{\frac{1}{2}}}$$

Where
W = vapor flow rate in pounds per hour
AV = vapor flow area per square foot
V = density of vapor in pounds/cubic feet
L = density of liquid in pounds/cubic feet

DETAILED DESCRIPTION

Figure 1:
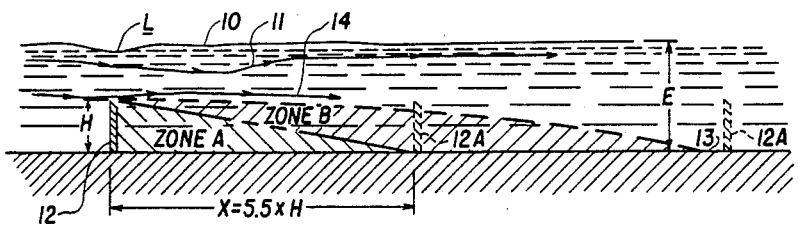
FIG. 1 is a longitudinal vertical section of an advancing fluid stream and constitutes a theoretical flow diagram relative to such stream; a submerged leaf gate or baffle is employed, and a second submerged baffle is illustrated in dotted lines for disposition proximate the termination of the low-pressure wedge or area in the stream pool posterior the downstream surface of the initial submerged baffle.

FIG. 1 is a generalized depiction of fluid-flow and the pressure zones A and B resulting therefrom in the presence of a submerged leaf gate or baffle 12. Liquid, L, comprising such fluid flow moves in the direction 10 and has flow stream lines 11 and 14 as illustrated. The submerged vertical baffle 12 is provided and is integral with and upstanding from a bottom or base 13. Accordingly, flow lines 11 and 14 converge over the top of the baffle 12 and then diverge back past such baffles, generally as indicated.

Owing to the presence of submerged baffle 12, pressure zone A will be generated in the shadow of the baffle, i.e., on the lee, or downstream side of the baffle, such zone A being a reduced pressure area of relatively constant reduced pressure for a given rate of fluid flow. Zone B will be more turbulent and exhibits varying but increased pressures along such zone. Reduced pressure zone A is believed to result from the Bernoulli effect, owing to the constrictive presence of the upper edge of baffle 12, and also by virtue of recirculating vertical eddy currents that proceed back to the lee side of the baffle in the zone A region. Dynamics of such fluid flow and resultant pressure zones created are more fully described in the November, 1968 edition of the Journal of the Hydraulics Division, Proceedings of the American Society of Civil Engineers, pages 1383 through 1397. Relative to the reduced pressure zone A, standard civil engineering texts which treat the flow in open channels, where sand dunes are disposed underneath a progressing stream or river, expound on the fact that on the lee side of any sand dunes in the stream or river bed, there will be reverse recirculation flows or vertically circulating eddy currents, oriented in a vertical plane, which operate to reduce the hydrostatic pressures at the lee side of such dunes.

The "Pressure Fluctuations in Reattaching Flow" article (by Narrayanan & Reynolds, Journal of the Hydraulics Division, Proceedings of the American Society of Civil Engineers, November, 1968), teaches that zone A will be wedge-shaped and will persist to a distance of the order of 5.5 times the height of the submerged baffle. It is proposed in the present invention to take advantage of this phenomenon by introducing a second submerged baffle at 12A shown in dotted lines in FIG. 1, this so that the reduced pressure zone A is found completely between the areas separating the two baffles 12 and 12A. Accordingly, the distance X, measured between the forward faces of the two baffles, in a preferred embodiment, will be approximately equal to 5.5 times the height of the baffles 12, 12A.

The second baffle 12A will likewise develop a "shadow" or a second reduced-pressure zone A at the lee side thereof, and so on for the succession of baffles utilized. The addition of subsequent baffles at the termination of low pressure zones A is believed novel as utilized in the present invention. Likewise completely new to the art is the adoption of the principle of FIG. 1 in contact trays for distillation columns, and with the provision of vapor ascent apertures proximate the lee side of the several submerged baffles to take advantage of low-pressure conditions thereat for effectively increasing vapor/liquid contact, froth produced, and heat exchange resulting therefrom. Again, as the Narrayanan & Reynolds article teaches: that zone A is in fact a wedge-shaped region of weak recirculation in a region of nearly uniform low pressure, certainly much lower than the upstream pressure.

Figure 3:
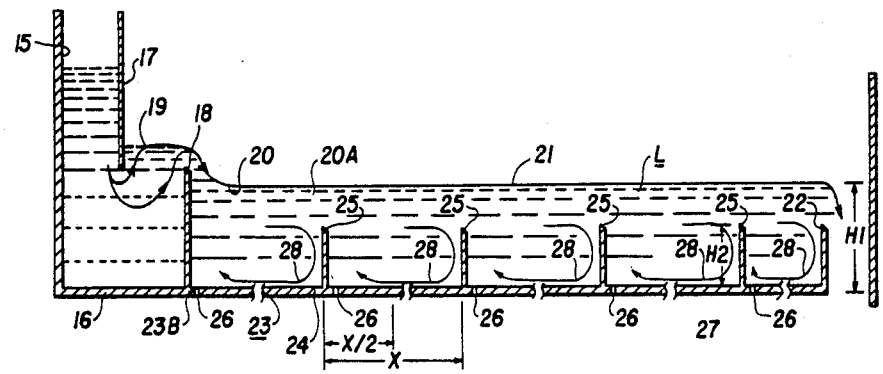
FIG. 3 is a vertical cross-section taken along the line 3—3 in FIG. 2, illustrating fluid-flow and recirculation or eddy streams in the reflux pool; for ease of illustration, inter-baffle spacing is shown reduced from that preferably actually practiced, as illustrated in FIG. 1.

Zone B on the other hand, will proceed to a distance of approximately 15½ times the height of the submerged baffle; this latter region is a region of very active recirculation, and pressure therein varies from the low pressure in zone A up to normal stream pressure. As illustrated in FIG. 3, the areas at 27 will be essentially quiescent, allowing for gradual recirculation of eddy current fluid flow, 28, to the apertured area to the left of respective areas 27.

Figure 2:
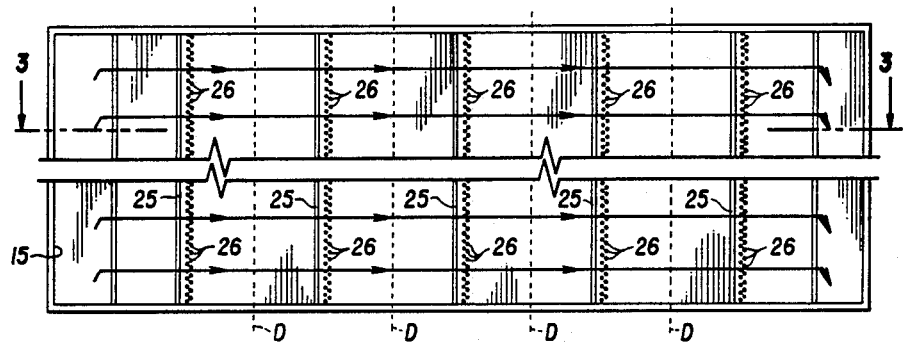
FIG. 2 is a plan view of a column section incorporating a downcomer, an outlet weir, and a representative vapor/liquid contact tray of the present invention between the two and over which reflux liquid uniformly flows.

In FIGS. 2 and 3 a downcomer 15 includes a partition 17 cooperating with an inlet weir 18, upstanding from a base 16, which forms a throat 19. Submerged baffles 25 are preferably mutually spaced in accordance with the teachings and baffle spacing of FIG. 1; liquids L, having liquid level 21, as determined essentially by the outlet weir 22, flows in the directions indicated, including production of recirculating eddy currents 28. Apertures 6 in the base 16 are preferably confined to areas of inter-baffle spacing between respective downstream baffle sides and midpoints of baffle spacing, this to effect vapor-admittance into the tray proximate the low pressure area, zone A, such that a quiescent zone 27 persists at each of the downstream half of inter-baffle spacings.

In the operation of the structure illustrated in FIGS. 2 and 3, reflux liquid descends the downcomer and rises at throat 19 to cascade over the inlet weir 18 and advance in the direction of arrow 20, over the successive, submerged baffles 25, to proceed to and over the outlet weir 22. The low-pressure areas proximate the eddy currents 28, at their upstream portions, maximizes efficiency of vapor/liquid contact above apertures 26.

Accordingly, what the present invention provides is a new and improved vapor/liquid contact tray for use in a variety of arts related to distillation, refining, fractionation, and so on.

Figure 4:
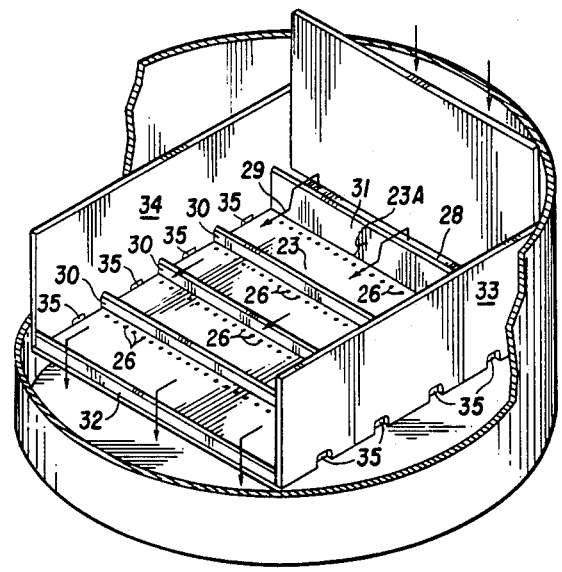
FIG. 4 is a fragmentary, isometric view of a contact tray structure that can be employed in a retrofitting or a circular, alternate reflux flow distillation column.

FIG. 4 shows a vertical round column being retrofitted by contact tray 23A incorporating inlet and outlet weirs 31 and 32 and intermediate baffles 30. Side partitions 33 and 34 are provided, the same having apertures 35 to allow for the return of liquid that might accumulate owing to vapor decay and splashing that occur at the tray stage. Apertures 26 are, of course, the vapor/liquid contact ports for ascending vapors and these are shown restricted to areas approximate the lee sides of the various weirs and baffles.

Figure 5:
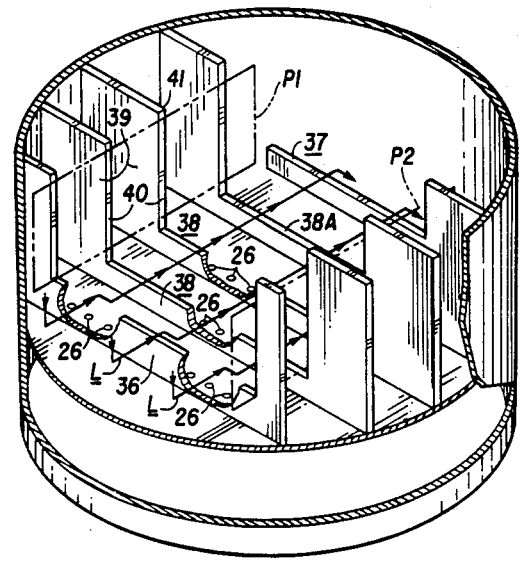
FIG. 5 is similar to FIG. 4 but illustrates alternative structure that can be used to retrofit a circular distillation column.

FIG. 5 illustrates a structure similar to FIG. 4, and which shows that the contact tray this time may include a series of weirs or baffles 38 having opposite individual sides 41 provided with edges 40 mutually coplanar in respective planes P1, P2. These latter edges define an essentially rectangular tray wherein fluid is unidirectional and uniform thereacross. Respective inlet and outlet weirs 36 and 37 are also provided. It will be observed that the central portions 38A of the baffles 38 will be in submerged condition similar to that seen in FIG. 3. The series of holes 26 will be provided proximate the anterior side or lee side of the individual baffle portions.

What is provided, therefore, is an effective rectangular tray, whether by virtue of the structure shown in FIG. 2 or the embodiments of FIG. 4 and FIG. 5, taken into consideration the coplanar constraining edges 40, wherein submerged baffles are employed to generate in vertical planes recirculating eddy currents to augment the Bernoulli effect of fluid-flow over the upper edges of the baffles and weirs, to create low pressure areas proximate the vapor/liquid holes or apertures to maximize heat exchange, vapor/liquid mixing, and overall plate efficiency while substantially lowering vapor pressure drop per tray location.

Figure 6:
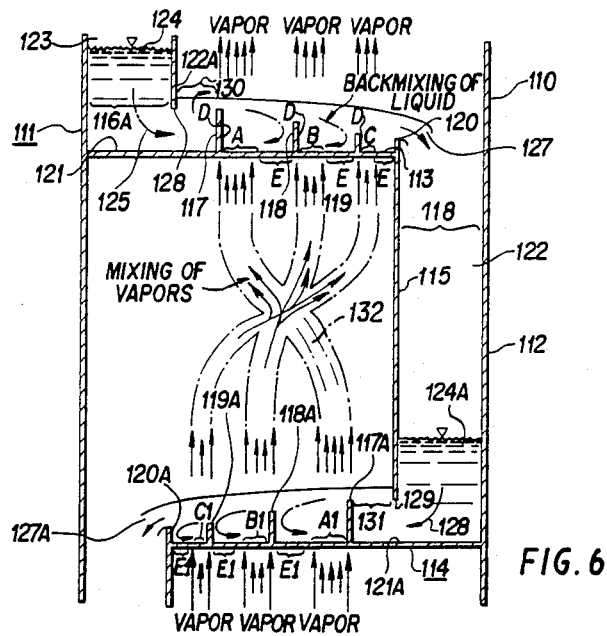
FIG. 6 is a diagrammatic side elevation of a column employing a pair of mutually-spaced vapor liquid contact trays in accordance with the principles of the present invention; the structure of FIG. 6 and the vapor flow paths depicted therein refer to an alternating-flow type system wherein flow across the plate of reflux liquid alternates from one plate to the next.

Referring now to FIGS. 6-19, the invention will be described with respect to the feature of the invention wherein the summation of the aperture hole areas is progressively less for subsequent inter-baffle sectors in the downstream direction. In FIG. 6, the column 110 is shown to include outer walls 111 and 112 and, supported by the same, a pair of vapor-liquid contact trays 113 and 114 which are mutually vertically spaced apart and are joined by a downcomer wall 115. A structure 116 formed by the downcomer wall 115 and the outer wall 112 serves as the downcomer structure for the conducting of reflux fluid from the upper tray 113 to the lower tray 114.

The upper tray 113 includes a series of the baffles 117-120, with the baffle 117 comprising an inlet weir and the baffle 120 comprising an outlet weir. These baffles may be progressively reduced in height as indicated in FIG. 6 or, optionally, the baffles, in certain applications, may be of essentially uniform height, as shown in the righthand portion of FIG. 9. Returning to FIG. 6, it is seen that another downcomer structure 116A is at the upper left in the figure and receives reflux liquid flow from any contact tray disposed thereabove.

The contact tray 113 has a base 121 which forms a support for downcomer reflux liquid and also is provided with sets of rows of apertures A, B, and C, which sets are respectively proximate the downstream surface at D of the respective baffles 117-119. There will be a greater number of holes in set A than in set B, and a greater number of holes in set B than set C. There will be provided a non-apertured recirculation zone at E, preferably not less than 40% of the width of each of the inter-baffle sectors, and definitely not less than aperture inter-row spacing, so as to provide for a back-mixing of liquid back into the areas immediately over the hole sets at A, B, and C. This back-mixing is in the form of eddy currents which flow in the direction indicated; such eddy currents are necessary to provide the return flow needed for increasing efficiency and enrichment of fractions proximate and above the respective hole sets, as discussed above.

The lower vapor/liquid contact tray 114 includes a base 121A corresponding to the base 121 in the upper part of the figure; and is provided with a series of baffles or weirs 117A–120A, as indicated. The baffle 117A comprises an inlet weir and the baffle 120A comprises an outlet weir. Downcomer walls 115 and 122A, with the outer walls 111 and 112, form downcomer areas 122 and 123 whereby to admit downcomer reflux fluid to form hydrostatic heads at levels 124 and 124A.

Pressure is created by the respective hydrostatic heads to urge the reflux liquids in the directions as shown by the arrows 125 and 126, thus to carry the reflux liquid over the baffles indicated to reflux downflows at 127 and 127A.

The weirs or baffles 117A–120A will correspond to the baffles 117–120 in the upper part of the figure. Downcomer structures at 116 and 116A will be close relative to their incorporated side walls 112 and 111, and lower extremities 128 and 129 will form respective throats 130 and 131, relative to the upper portions of the initial baffles of 117 and 117A, respectively.

The structure and system of FIG. 6 illustrates an alternating reflux flow system wherein the direction of flow alternates between successive, vertically mutually spaced trays. Accordingly, vapors proceed upwardly as indicated at the lower part of FIG. 6, to enter and pass through the holes provided in the respective sectors of base 121A. Enriched and augmented vapors pass upwardly through the froth to proceed to a mixing-of-vapor area at 132 which essentially homogenize the ascending vapors. Vapors will proceed from such area upwardly to base 121 of the next succeeding vapor/liquid contact tray. Such vapors will pass through aperture sets A, B, and C, to proceed upwardly through the reflux liquid and the froth disposed thereabove to the vapor flows above the level of the upper reflex liquid pool, as indicated. The lefthand portion of the so-homogenized ascending vapors will be conducted and will flow essentially through the area A of the upper tray, owing to the greater presence of holes thereat, resulting in greater efficiency of vapor/liquid heat exchange and separation, whereby to maximize efficiency of heat exchange and vapor separation to achieve the lefthand vapor flow above the upper reflux liquid pool as indicated in FIG. 6. Progressively higher boiling fractions at such tray are obtained the middle and righthand vapor paths in the upper portion of FIG. 6.

In the operation of the column illustrated in FIG. 6, a downwardly cascading reflux liquid enters the structure at 116A, proceeds along arrow 125 through throat 130 and enters into the baffle or weir area. Flow continues across the upper ends of the baffles 117–119 and backmixing of liquids or eddy currents are produced by the presence of such baffles in returning portions of reflux liquid flow back over the apertured areas of the baffle sections so as to cause a further separation of vapor from the reflux liquid, through a heat exchange relationship. This phenomenon is present in all sectors of the base as formed by the successive baffles. The vapor recovered, together with vapors ascending through the liquid, are joined and pass to the next upward contact tray, to a take-off structure (not illustrated) and/or a condenser structure (not illustrated). The reflux liquid at 127 flows outwardly through downspout or downcomer structure 116 to enter the next tray and proceed thereacross in a direction reverse to the direction of flow relative to the upper tray.

Figure 7:
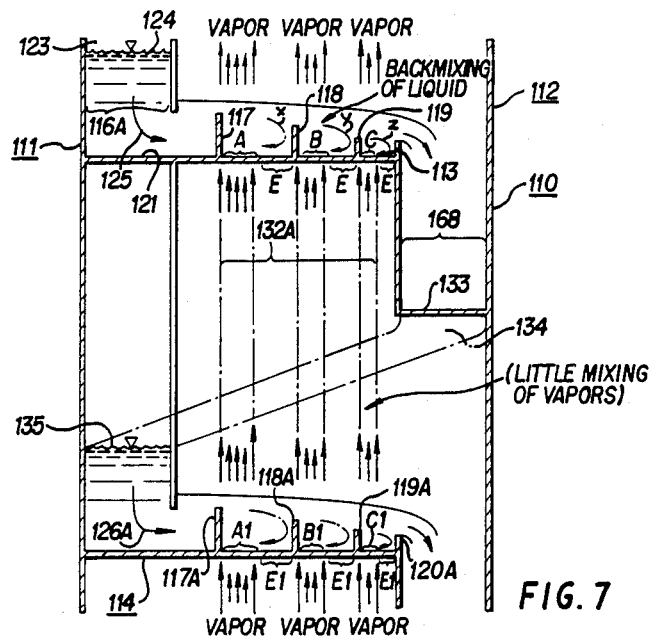
FIG. 7 is similar to FIG. 6 but indicates the invention as being employed in a unidirectional flow system, wherein reflux liquid flow across the contact trays is in the same direction for all trays in the column.

The structure of FIG. 7 is and operates essentially the same as that shown in FIG. 6 with the exception that, this time, the structure is arranged for unidirectional flow of reflux liquid across the successive liquid trays 113, 114. Accordingly, a base 133 may be provided for the downcomer structure at 116B in FIG. 7, the base 133 forking a portion of a part helical ramp 134 which proceeds outside of the vapor chamber to conduct descending reflux liquid to point 135 relative to the lower vapor/liquid tray. Accordingly, as seen in FIG. 7, liquid flow is in the same direction relative to the mutually spaced trays 113 and 114. See the inventors' co-pending U.S. patent applications entitled VAPOR/LIQUID CONTACT COLUMN STRUCTURE, Ser. No. 840,134 filed 03/17/86, now U.S. Pat. No. 4,750,975, issued June 14, 1988, and the aforementioned parent application entitled VAPOR/LIQUID CONTACT DEVICE, Ser. No. 054,181 filed 05/26/87, now U.S. Pat. No. 4,762,651, issued Aug. 9, 1988, which are fully incorporated herein by way of reference. Thus, there is very little mixing of vapors at the area between the trays; rather, vapor ascent is in the path indicated. Indeed, this is believed to be the most efficient way of fraction separation since alignment of the greater percentage of vapor apertures, i.e. at areas A and A1 in FIG. 7 to produce, with the eddy current feature at X, Y and Z as above explained, the most efficient separation. Thus at area 132A there will be essentially no mixing of the parallel ascending vapor flows. The areas 132 and 132A in FIGS. 6 and 7, respectively, may be considered as the inter-plate vapor ascent area for the respective column structures.

Figure 8:
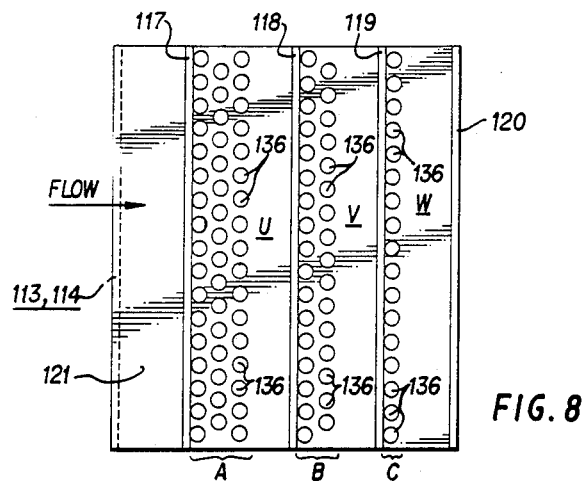
FIGS. 8 and 9 are top plan and side elevation views, respectively, of one type of contact tray which may be used in the present invention in FIGS. 6 and 7, by way of example.
Figure 9:
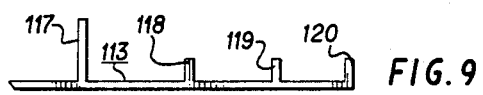

FIGS. 8 and 9 illustrate in plan and side elevation the vapor-liquid plate 113 of FIG. 6, but illustrating further that the weirs or baffles to the right of inlet weir 117 may be the same height if this is desired.

The structure of FIGS. 8 and 9 may also comprise the structure of plate 114 in FIG. 6. Sets of apertures A, B, and C are formed by a multiplicity of apertures 136 being disposed in base 121 thereof. Empirical testing has indicated that higher efficiencies are obtained where, for uniform hole diameters, the number of apertures constituting set A is approximately 50% of the entire number of apertures through the base of the tray. The number of apertures in set B will be essentially one-third of the total number of apertures to the base. Finally, the number of apertures in apertured area C represent one-sixth of the apertures of the base. Where the apertures are different as to hole size, then the summation of the aperture areas in the respective sets, and thus the ratios between the summations of aperture areas in sets A, B, and C, respectively, will be of the order of one-half to one-third to one-sixth.

Figure 10:
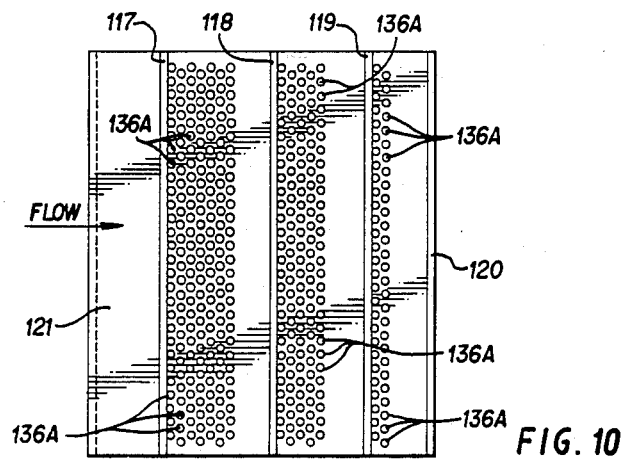
FIGS. 10 and 11 are similar to FIGS. 8 and 9 but represent an alternative plate that can be used wherein hole size is reduced but the number of holes per inter-baffle sector is substantially increased.
Figure 11:
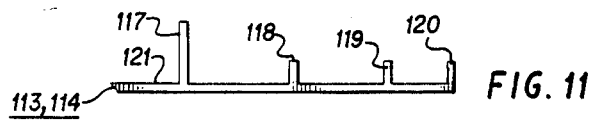

Conceivably, the number of apertures for the various sectors U, V, and W might be increased; however, there needs to be sufficient recirculation space, i.e. unapertured areas proximate the near side of the downstream remaining weirs, so that the eddy currents above referred to can be produced for effecting a recirculation of reflux liquid in the several interbaffle sectors to the aperture areas themselves, respectively. An alternate, vapor/liquid contact tray is indicated in FIGS. 10 and 11; such tray may be useful to constitute the trays 113, 114, in FIGS. 6 and 7. This time, relative to FIGS. 10 and 11, the holes 136A, corresponding to holes or apertures 136 in FIGS. 8 and 9, are of smaller diameter.

However, the summations of the sets of holes in sets A, B, and C, will be the same percentages, essentially, as above-specified: one-half to one-third, to one-sixth for the respective aperture sets A, B, and C, respectively. Where aperture sizes are the same, then the number of holes will be in accordance with the above proportion. Where hole sizes differ, then the summations of the hole areas for the respective sets will be in the proportion indicated, preferably. However, and notwithstanding the above, for all embodiments as contemplated by the present invention, there will be at least some minimal "dead space" as above specified, proximate the leading edge surfaces of the weirs so as to provide the eddy current action, as above described.

FIGS. 12–15 refer to experimental air-water simulation test results derived through operation of liquid/vapor contact trays constructed in accordance with the embodiments of FIGS. 8, 9 and 10, 11. FIGS. 18 and 19 refer to experimental air-water simulation test results derived through operation of a prior art liquid/vapor contact tray illustrated in FIGS. 16 and 17.

Figure 16:
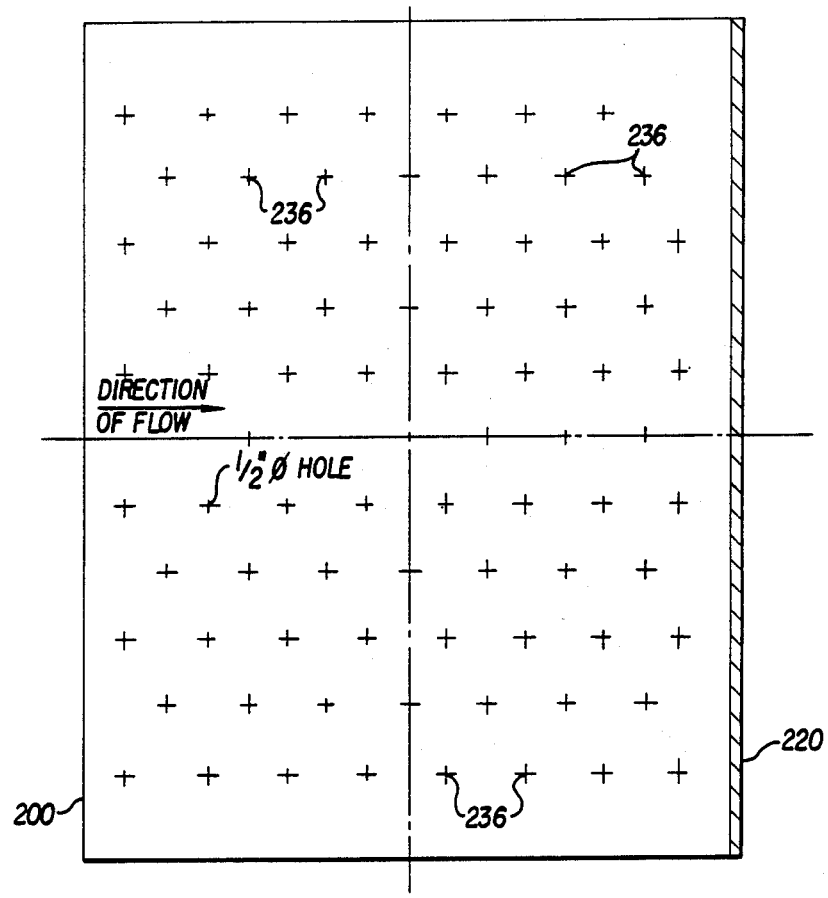
Figure 17:
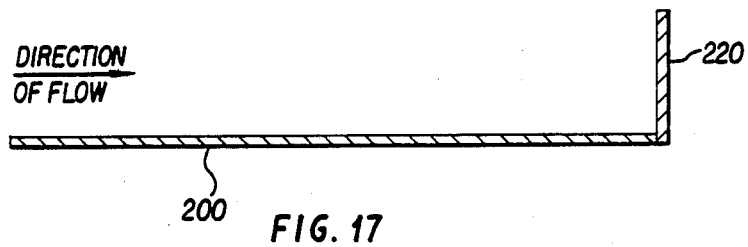
Figure 18:
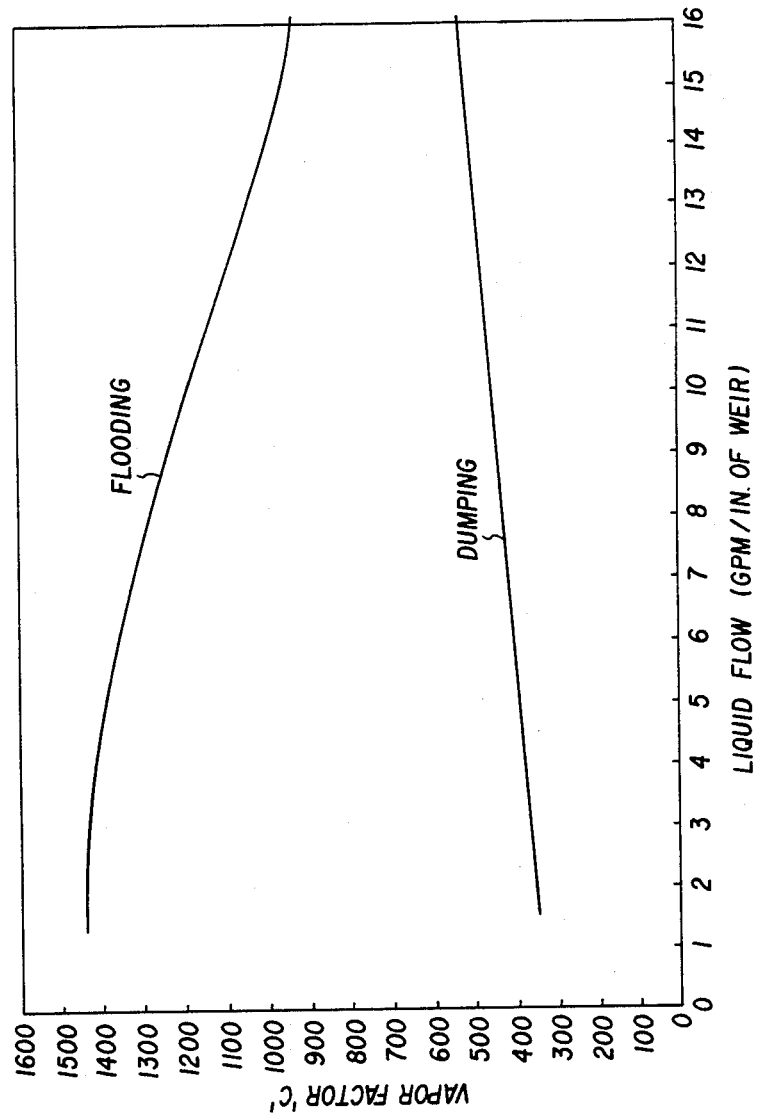

Referring initially to FIGS. 16 and 17, the prior art tray is generally indicated by the reference numeral 200. A plurality of apertures or holes 236 are uniformly spaced across the surface of the tray 200 and there is a single exit weir 220 arranged at the downstream most end of the tray 200.

Figure 12:
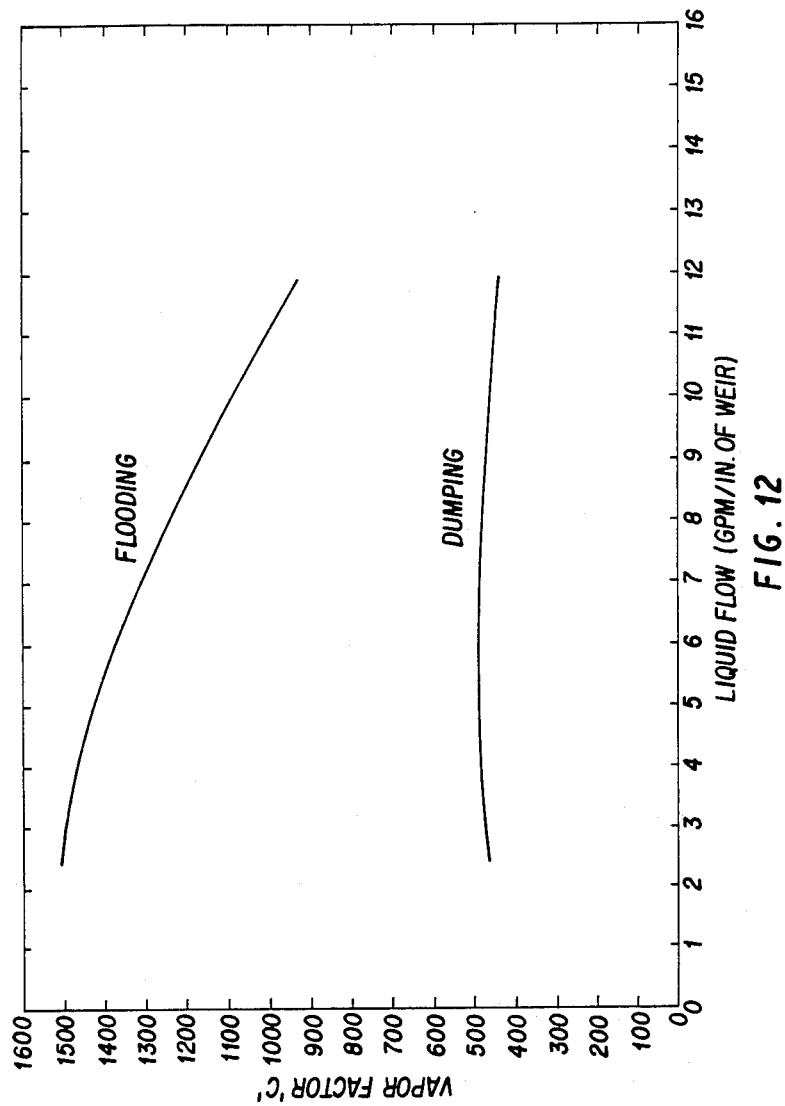
Figure 14:
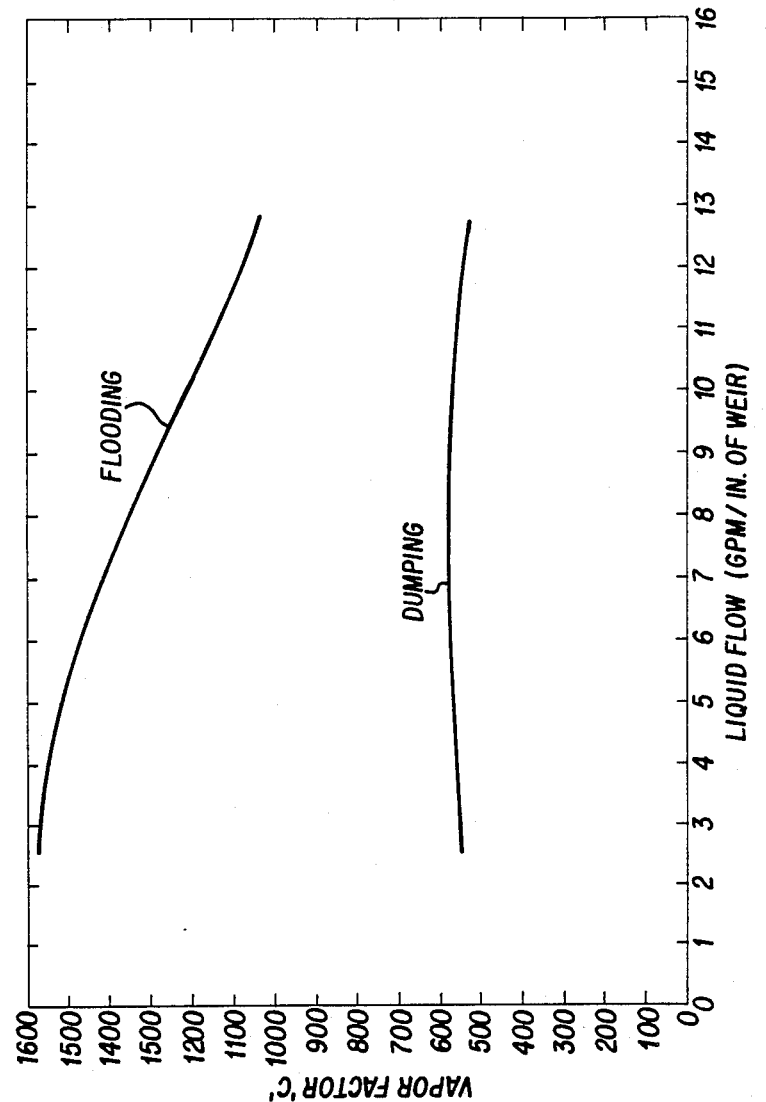

With respect to each of the experimental air-water simulation tests, FIGS. 12, 14 and 18 plot flooding and dumping test result curves wherein the "C" factor, as defined above, is given as the ordinate and the abscissa is the flow rate in gallons-per-minute of reflux liquid across the tray surface per running inch of baffle or weir. The term "flooding" is defined as the situation when the velocity of the upward flow of vapor through the plate is so high that there is effected not merely a frothing of the reflux liquid but a blowing of refluex to the tray above. By "dumping" is meant the phenomenon which occurs when vapor pressure beneath the contact tray is not sufficient to keep liquid on the tray; thus, reflux liquid flows through the vapor holes of the tray base.

Figure 13:
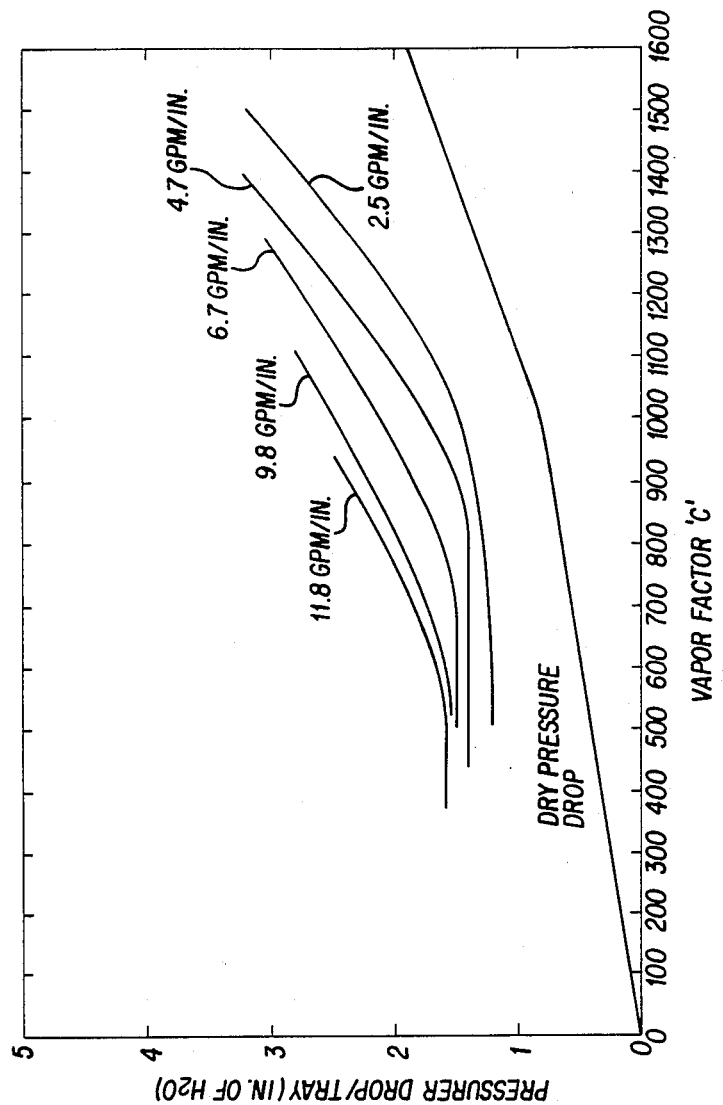
Figure 15:
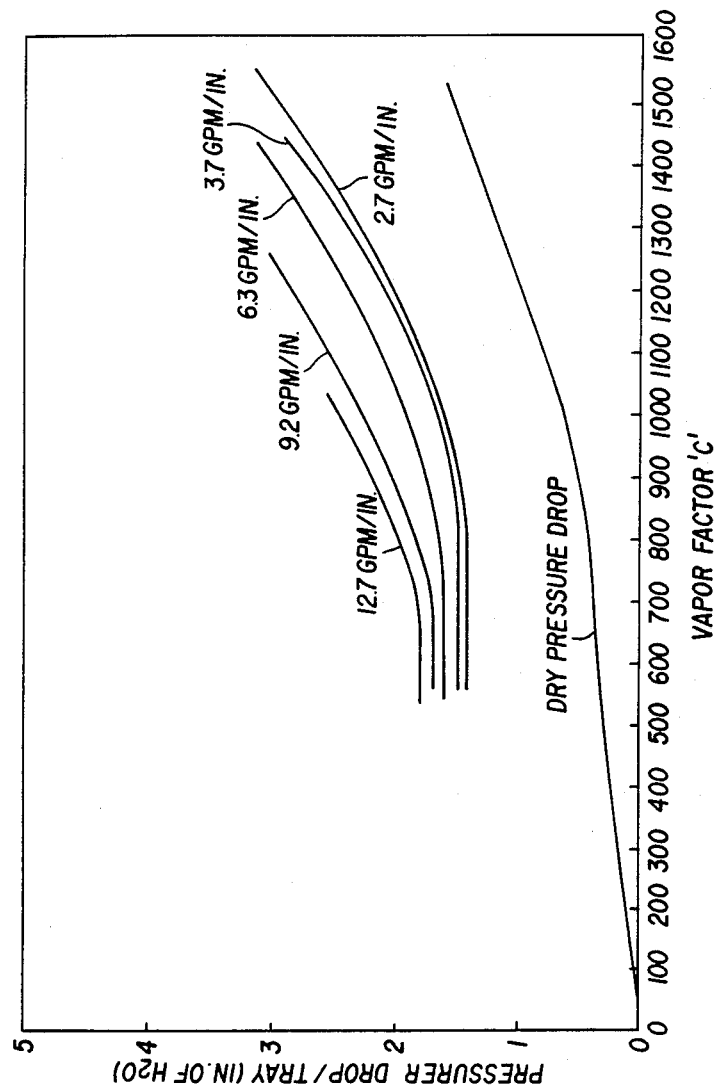

FIGS. 13, 15 and 19 relate to characteristic curves for each of the tests, respectively. The "C" factor represents the abscisa of each curve and the pressure drop (in inches of water) across the plates is the ordinate. The various curves plotted for each of the graphs of FIGS. 13, 15 and 19 relate to pressure drop characteristics for various flow rates of reflux liquid per running inch of representative weir.

The following is a summary data sheet for each air-water simulation test:

TEST NO. 1 (Prior Art)

TYPE OF TEST: Air-water simulation
TYPE OF COLUMN: 22" I.D. column of the type illustrated in FIG. 7.
TYPE OF TRAY: Sieve Tray as illustrated in FIGS. 16, 17
NUMBER OF TRAYS: Four
TRAY SPACING: 18"
COLUMN DATA:
    TOTAL INSIDE (CROSS-SECTIONAL) AREA=380.13 sq. in.
    VAPOR (TRAY) AREA=138.38 sq. in.
    DOWNCOMER AREA=241.76 sq. in.
    STAGNANT ZONE AREA=0.00 sq. in.
TRAY DATA:
    EXIT HEIGHT OF EXIT WEIR 220=2.0 in.
    WEIR 220 LENGTH=13.5 in.
    SIZE OF HOLES=½ in. dia.
    NUMBER OF HOLES=83
    AREA OF HOLES=16.30 sq. in.
    CONTACT (TRAY) AREA=138.38 sq. in.
DENSITY OF VAPOR=0.065 lbs./cu. ft.
DENSITY OF LIQUID=62.4 lbs./cu. ft.

The flooding and dumping curves for Test No. 1 are illustrated in FIG. 18 and the pressure drop characteristic curves are illustrated in FIG. 19.

TEST NO. 2

TYPE OF TEST: Air-water simulation
TYPE OF COLUMN: 22" I.D. column of the type illustrated in FIG. 7.
TYPE OF TRAY: Tray as illustrated in FIGS. 8 and 9.
NO. OF TRAYS: Four
TRAY SPACING: 18"
COLUMN DATA:
    TOTAL INSIDE (CROSS-SECTIONAL) AREA=380.13 sq. in.
    VAPOR (TRAY) AREA=138.38 sq. in.
    DOWNCOMER AREA=241.76 sq. in.
    STAGNANT ZONE AREA=0.00 sq. in.
TRAY DATA:
    EXIT WEIR 120 LENGTH=13.5 in.
    HEIGHT OF BAFFLE 117: 2 in.
    HEIGHT OF BAFFLES 118–120: ¾ in.
    SIZE OF HOLES=½ in. dia.
    NUMBER OF HOLES=99
    AREA OF HOLES=19.44 sq. in.
    CONTACT (TRAY) AREA=138.38 sq. in.
DENSITY OF VAPOR=0.065 lbs./cu. ft.
DENSITY OF LIQUID=62.4 lbs./cu. ft.

The flooding and dumping curves for Test No. 2 are illustrated in FIG. 12 and the pressure drop characteristic curves are illustrated in FIG. 13.

TEST NO. 3

TYPE OF TEST: Air-water simulation
TYPE OF COLUMN: 22" I.D. column of the type illustrated in FIG. 7.
TYPE OF TRAY: Tray as illustrated in FIGS. 10 and 11.
NO. OF TRAYS: Four
TRAY SPACING: 18"
COLUMN DATA:
    TOTAL INSIDE (CROSS-SECTIONAL) AREA =380.13 sq. in.
    VAPOR (TRAY) AREA =138.38 sq. in.
    DOWNCOMER AREA =241.76 sq. in.
    STAGNANT ZONE AREA =0.00 sq. in.
TRAY DATA:
    EXIT WEIR 120 LENGTH =13.5 in.
    HEIGHT OF BAFFLE 117: 2 in.
    HEIGHT OF BAFFLES 118–120: ¾ in.
    SIZE OF HOLES =¼ in. dia.
    NUMBER OF HOLES =392
    AREA OF HOLES =19.24 sq. in.
    CONTACT (TRAY) AREA =138.38 sq. in.
DENSITY OF VAPOR =0.065 lbs./cu. ft.
DENSITY OF LIQUID =62.4 lbs./cu. ft.

The flooding and dumping curves for Test No. 3 are illustrated in FIG. 14 and the pressure drop characteristic curves are illustrated in FIG. 15.

As clearly illustrated by a comparison of FIGS. 13, 15 and 19, the various pressure drops across the trays for the trays of FIGS. 8, 9 and 10, 11 according to the invention (graphs of FIGS. 13 and 15) are considerably lower than the corresponding pressure drops across the prior art tray of FIGS. 16, 17 (graph of Fg. 19). By way of example, at "C"=800 the pressure drop across the tray of FIGS. 8 and 9, at a flow rate of 4.7 GPM/in. equalled 1.4 ins. of $H_2O$, the pressure drop across the tray of FIGS. 10 and 11, at a flow rate of 6.3 GPM/in., equalled 1.62 ins. of $H_2O$ and the pressure drop across the prior art tray of FIGS. 16 and 17, at a flow rate of 5.4 GPM/in., equalled 3.45 ins. of $H_2O$. Thus, the pressure drop across the prior art tray during the air-water simulation tests was more than double the pressure drop across the trays built in accordance with the present invention under comparable testing conditions.

What is claimed is:

1. A liquid-flow accommodating vapor-liquid contact tray, which comprises
    a base having an inlet end and an outlet end, and a series of mutually spaced baffles upstanding from said base and transverse to said liquid-flow,
    said base being provided with a series of sets of vapor admittance apertures respectively disposed between said baffles,
    said aperture sets being constructed and arranged for progressively reduced vapor flow through said base as liquid-flow proceeds from said inlet end to said outlet end,
    vapor flow through said base being greatest at that area of said base, having one set of said apertures, which is proximate said inlet end.

2. The vapor-liquid contact tray of claim 1 wherein the number of apertures in said sets of apertures is greatest for that set nearest said inlet end and is progressively reduced for succeeding ones of said sets in the downstream direction of liquid flow.

3. The vapor-liquid contact tray of claim 1 wherein said sets of apertures are each formed respectively in a region of the base spaced from a succeeding one of said baffles to provide a series of respective non-apertured, essentially quiescent inter-baffle zones accommodating the production of return-flow eddy currents, relative to said liquid flow, over that nearest set of apertures upstream from respective ones of said quiescent zones.

4. The vapor-liquid contact tray of claim 1 wherein said sets of apertures are respectively disposed proximate the nearest upstream baffle, respectively.

5. The vapor-liquid contact tray of claim 1 wherein the total number of said vapor admittance apertures is contained in at least three sets of said apertures, the ratios of the numbers of said apertures per set, to the total of said apertures disposed through said base, being of the order of one-half to one-third to one-sixth from said set of apertures proximate to said inlet end to said set of apertures proximate to said outlet end.

6. The vapor-liquid contact tray of claim 1 wherein apertures of each of the sets of apertures are arranged in essentially parallel rows transverse to the direction of fluid flow,
    respective base areas downstream from the respective aperture sets to the next respective downstream baffle, being non-apertured and having a liquid-flow direction distance greater than interrow aperture spacing.

7. The vapor-liquid contact tray of claim 1 wherein extent of non-apertured areas of said base, adjacent the respective ones of said aperture sets, are not less than essentially 40% of inter-baffle spacing, for the respective aperture sets.

8. The vapor-liquid contact tracy of claim 1 wherein said base is rectangular.

9. A vapor-liquid counter-current column structure comprising
    an upstanding housing defining a wall enclosure,
    a pair of horizontal, mutually vertically spaced liquid-flow-accommodating vapor-liquid contact trays disposed in said column and affixed to said wall enclosure,
    a downcomer structure providing liquid intercommunication between said trays,
    each of said contact trays including a vapor-liquid contact tray having an inlet end and an outlet end, relative to such liquid flow, and a base,
    said base including a series of mutually spaced baffles upstanding from said base and transverse to said liquid-flow,
    said base being provided with a series of sets of vapor admittance apertures respectively disposed between said baffles,
    said aperture sets being constructed and arranged for progressively reduced vapor flow through said base as liquid-flow proceeds from said inlet end to said outlet end,
    vapor flow through said base thereby being greatest at that area of the base, having one set of said apertures, which is proximate said inlet end,
    said downcomer structure interconnecting said outlet end of an uppermost one of said trays to the inlet end of the remaining tray.

10. The column structure of claim 9 wherein said inlet ends of said contact trays are essentially vertically aligned, said outlet ends also being vertically aligned, whereby to accommodate unidirectional liquid flow over said trays.

11. The column structure of claim 9 wherein said inlet end of an uppermost one of said contact trays is disposed over said outlet end of a next contact disposed therebeneath, whereby to accommodate alternating liquid flow over said trays.

12. The column structure of claim 9 wherein each one of the liquid-flow accommodating vapor-liquid contact trays is rectangular.

13. A vapor-liquid reflux-liquid conducting contact tray comprising:
    an inlet throat structure,
    a base secured to and extending downstream from said inlet throat structure, and including a series of mutually spaced essentially parallel baffles upstanding from said base,
    said base being provided with a series of vapor-liquid contact apertures proximate said throat structure designed for approximately fifty-percent passage of vapors reaching said base from therebelow,
    inter-baffle base sectors downstream therefrom progressively being arranged, as to aperture sets formed therethrough, for progressively less vapor flow at such sectors,
    said base sectors having non-apertured reflux recirculation zones spaced downstream from said aperture sets to the next one of said baffles, respectively, whereby to allow for eddy current return flow of reflux liquid over respective adjacent aperture sets respectively upstream therefrom.

14. A method of mixing a vapor flow and a countercurrent reflux liquid flow, comprising the steps of:
providing a vapor-liquid contact tray device having an inlet end for receiving reflux liquid from a region above said tray device and an outlet end for dispensing reflux liquid therebelow;
providing a source of vapor flow beneath said tray device; and
passing said vapor flow upwardly through said contact tray device in a manner such that the vapor flow is concentrated through that portion of said tray device which is nearest said inlet end and is progressively less concentrated as to vapor flow through said tray device in the downstream direction of reflux liquid flow across the tray device.

15. A method of mixing a vapor flow and a countercurrent reflux liquid flow, comprising the steps of:
providing a vapor-liquid contact tray device having vapor-liquid contact areas, a series of mutually-spaced baffles dividing said contact areas, an inlet end for receiving reflux liquid from a region above said tray device to flow over said baffles, and an outlet end for dispensing reflux liquid therebelow;
providing a source of vapor flow beneath said tray device; and
passing said vapor flow upwardly through said contact tray in a manner such that vapor flow is concentrated through that one of the vapor-liquid contact areas of said tray device which is nearest said inlet end and is progressively less concentrated as to vapor flow through said vapor-liquid contact areas of the tray device, between selected ones of said baffles, in the downstream direction of reflux liquid flow toward said outlet end,
selected portions downstream of each one of the vapor-liquid contact areas of said contact tray being aperture-free downstream of said contact areas and before a next downstream baffle, whereby to provide for eddy current return flow of reflux 16. A vapor-liquid contact tray, which comprises
a base having an inlet end and an opposite outlet end and a series of parallel horizontally mutually spaced transverse baffles upstanding from said base upstream from said outlet end to divide the contact tray into vapor-liquid contact areas,
said base being provided with respective sets of vapor admittance apertures, one of the sets of vapor admittance apertures being in each of the vapor-liquid contact areas, each of the sets of vapor admittance apertures being proximate one of said baffles on the side thereof nearest said outlet end,
each of the vapor-liquid contact areas having a width approximately equal to 5.5 times the baffles height, and
said baffles being of progressively reduced height in the direction toward the outlet end.

17. A vapor-liquid contact tray, which comprises
a base having an inlet end and an opposite outlet end and a series of parallel horizontally mutually spaced transverse baffles upstanding from said base upstream from said outlet end,
said base being provided with respective sets of vapor admittance apertures respectively proximate each one of said baffles on the sides thereof nearest said outlet end;
each one of said sets of vapor admittance apertures being formed respectively in a region of the base spaced from a next succeeding downstream one of said baffles to provide a series of respective non-apertured, essentially quiescent inter-baffle zones accommodating the production of return-flow eddy currents over the nearest set of apertures upstream from respective ones of said quiescent zones; and
wherein spacing between baffles is of the order of 5.5 baffle height.

18. The contact tray of claim 17 wherein vapor admittance aperture placement is confined to areas of said base not exceeding a distance of one-half of the spacing between baffles.

* * * * *

UNITED STATES PATENT AND TRADEMARK OFFICE
CERTIFICATE OF CORRECTION

PATENT NO. : 4,869,851
DATED : September 26, 1989
INVENTOR(S) : Trent J. PARKER et al.

It is certified that error appears in the above-identified patent and that said Letters Patent is hereby corrected as shown below:

Column 5, line 45, change "6" to --26--.

Column 7, line 49, after "obtained" insert --in--.

Column 9, line 37, change "refluex" to --reflux--.

Column 10, lines 44 and 45, after "simulation" delete "TYPE OF COLUMN".

line 45, before "22" I.D." insert --TYPE OF COLUMN:--.

Column 11, line 9, change "Fg." to --Fig.--.

Column 12, line 1, change "interrow" to -- inter-row --;

line 8, change "tracy" to --tray--.

Column 14, line 2, after "reflux" insert --liquid upstream back to the respective contact area of said contact tray.--.

line 16, change "baffles" to --baffle--;

UNITED STATES PATENT AND TRADEMARK OFFICE
CERTIFICATE OF CORRECTION

PATENT NO. : 4,869,851

DATED : September 26, 1989

INVENTOR(S) : Trent J. PARKER et al.

It is certified that error appears in the above-identified patent and that said Letters Patent is hereby corrected as shown below:

Column 14, line 39, after "5.5" insert --times--.

Signed and Sealed this

Thirteenth Day of November, 1990

Attest:

HARRY F. MANBECK, JR.

*Attesting Officer*　　　　*Commissioner of Patents and Trademarks*